Wm. J. Brundred,
Oil Tank and Reservoir.

REISSUED AUG 1 1871

4492

WITNESSES:
Parker H. Sweet, Jr.
W. J. Peyton.

INVENTOR:
Wm J. Brundred
By L. J. Johnston & Bro
his attorneys

UNITED STATES PATENT OFFICE.

WILLIAM J. BRUNDRED, OF OIL CITY, ASSIGNOR OF ONE-HALF HIS RIGHT TO GEORGE W. GLASS, OF PITTSBURG, PENNSYLVANIA.

IMPROVEMENT IN OIL-TANKS AND RESERVOIRS.

Specification forming part of Letters Patent No. 110,953, dated January 17, 1871; reissue No. 4,492, dated August 1, 1871.

*To all whom it may concern:*

Be it known that I, WILLIAM J. BRUNDRED, of Oil City, in the county of Venango and State of Pennsylvania, have invented a new and useful Improvement in Oil-Tank Discharging Apparatus; and I do hereby declare that the following is a full, clear, and exact description thereof, reference being had to the accompanying drawing and to the letters of reference marked thereon.

The nature of my invention consists in providing a convenient and ready means for discharging oil from tanks, more especially designed for tanks on railway cars or trucks, but applicable to tanks or oil-reservoirs in other situations. My invention also consists in providing a convenient and ready means for removing the valve and its stem from the tank or oil-reservoir.

To enable others skilled in the art to make and use my invention, I will proceed to describe its construction and operation.

Figure 2:
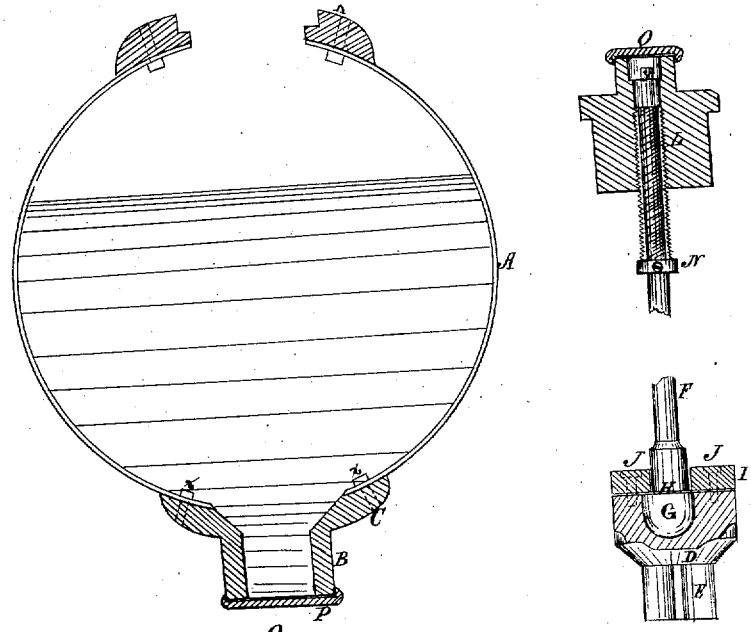
Figure 1:
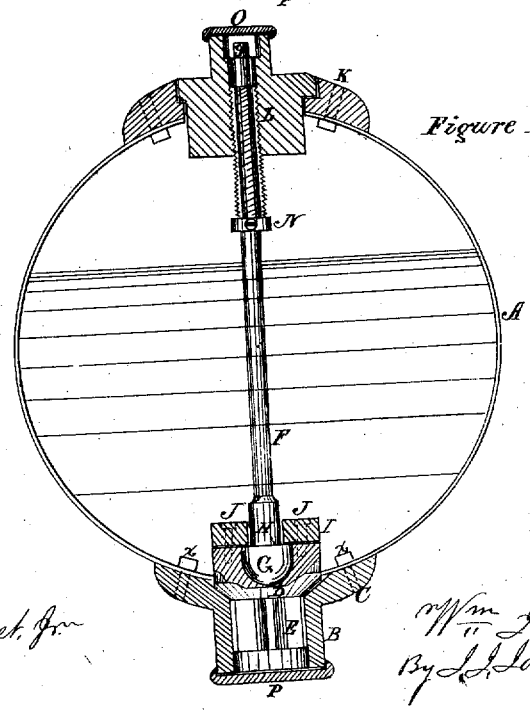

In the accompanying drawing which forms part of my specification, Figure 1 represents a transverse section of the oil-tank and a transverse and vertical section of the valve and castings connected therewith. Fig. 2 is a similar view, representing the valve removed from the oil-tank.

Similar letters of reference in the accompanying drawing have reference to similar parts.

A is the oil-tank, which may be of any desired size and form, and mounted upon a railway-car truck, or elevated in any other manner, so that the contents of the tank may be drawn off or discharged from its under side. B is a tubular casting forming the valve-seat. This casting is attached to the under side of the tank through the medium of a flange, C, and bolts X. P is a cap placed over the bottom end of the tubular casting B for the purpose of protecting the tubular part of it from dirt and dust; and also to prevent leakage; and also to prevent the discharge of the oil from the tank when it becomes necessary to remove the valve from its seat. D is a valve provided with wings E for guiding the valve while being raised from or lowered to its seat. F is the valve-stem, on the lower end of which there is an enlargement, G, provided with a shoulder, H, which, in connection with the annular plate I around the valve-stem and the cavity in the upper part of the valve, allows the valve sufficient play for rotating on the stem and for "seating." The valve D is secured to the stem F through the medium of the bolts J and annular plate I. The upper portion of the valve-stem F is provided with screw-threads which fit into screw-threads made in the casting L, which is fitted into and secured in or to a casting, K, by any of the known means. In the upper end of the casting L is a cavity sufficiently large to allow a wrench or key to pass down on the square end *y* of the valve-stem F, for revolving it for the purpose of raising or lowering the valve D, as may be desired. N is an adjustable collar placed on the valve-stem F to control its upward travel. O is a cap screwed onto the casting L, so as to cover the upper end of the valve-stem. The casting K is secured to the upper side of the oil-tank A, with its annular opening concentric with the annular opening in the casting B, secured to the under side of the tank. The diameter of the casting L is greater than the diameter of the valve D. By this arrangement the valve and its stem may be removed from the tank A, for repairs or other purposes, without the necessity of drawing off the oil or entering the tank after the oil is drawn off.

The advantages of the device hereinbefore described over any arrangement hitherto adopted must be apparent to all who are acquainted with the manner of transporting oil in tanks, or with the danger of entering a tank from which hydrocarbon oil has been drawn off. My improvement obviates the necessity of going into the tank at all, and allows the valve to be removed and replaced with ease and facility, and without the necessity of drawing off the oil in case the valve should need repairing.

Having thus described my invention, what I claim as new is—

1. The tubular casting K, its opening being greater in diameter than the diameter of the valve D, so that it may be withdrawn from the tank A without the necessity of entering the tank or drawing off the oil, as herein described.

2. The valve-rod or stem F, provided with an adjustable collar, N, as herein described, and for the purpose set forth.

3. The tubular castings K and L arranged on the upper side, and the casting B arranged on the under side of the tank A, with openings of said castings arranged concentric to each other, and combined with the valve D and its stem F, substantially as herein described, and for the purpose set forth.

W. J. BRUNDRED.

Witnesses:
HUGH C. GRAHAM,
JAMES J. JOHNSTON.